(12) United States Patent
Silverman et al.

(10) Patent No.: US 6,324,572 B1
(45) Date of Patent: Nov. 27, 2001

(54) COMMUNICATION NETWORK METHOD AND APPARATUS

(75) Inventors: Shmuel Silverman, Buffalo Grove; Raymond M. Liss, St. Charles; Randall R. Stewart, Crystal Lake, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/312,099

(22) Filed: May 14, 1999

(51) Int. Cl.[7] .............................. G06F 15/167; H04Q 7/20
(52) U.S. Cl. ........................ 709/215; 709/201; 455/433; 455/435; 714/11
(58) Field of Search .................................... 709/201, 202, 709/203, 227, 228, 229, 213, 214, 215; 455/403, 432, 433, 435; 714/1, 2, 4, 6, 10, 15, 11, 12

(56) References Cited

U.S. PATENT DOCUMENTS 5,774,660 * 6/1998 Brendel et al. ...................... 709/201
5,774,668 * 6/1998 Choquier et al. .................... 709/223
6,163,866 * 12/2000 Shrivastava .............................. 714/4

* cited by examiner

Primary Examiner—Dung C. Dinh
(74) Attorney, Agent, or Firm—Sayed Hossain Beladi

(57) ABSTRACT

In a network communication system (300) a method and apparatus includes generating a record of state information (360) associated with a service connection (370), associating the record of state information (360) to a first (320-1) of an N processing units (320-1 through N), storing the associated record of state information (360) at a first (340-1) of an N memory units (340-1 through N) corresponding to the first processing unit (320-1), multicasting the associated record of state information (360) over an area network (310) to be received by at least one of a second through N (320-2 through N) of the N processing units (320-1 through N), and storing the associated record of state information (360) at one of the N memory units corresponding to the least one of the second through N processing units (320-2 through N).

44 Claims, 6 Drawing Sheets

COMMUNICATION NETWORK METHOD AND APPARATUS

RELATED FIELD OF THE INVENTION

The present invention generally relates to communication systems, particularly, a network communication system.

BACKGROUND OF THE INVENTION

In a network communication system, failure of a service connection is a type of problem that in particular is associated with failure of a server or its interconnection. Failure of a service connection is highly undesirable in many types of service connections. To reconnect a failed service connection, the client of the service connection requests from a home server to re-build the service connection that may take up to 16 seconds. In case of data service connection, 1–16 seconds laps of time for re-building the connection service may not be a problem if the data reception is immune to a latency deficiency. However, in case of voice or video service connection, transportation latency is a major problem because communication of video or voice requires very low latency to maintain a coherent voice or video communication between two end users of the service connection. To overcome this problem, a fault tolerant network system with redundancy is implemented at high cost and complexity.

Referring to FIG. 1, a conceptual block diagram of a communication network according to a prior art is shown. To make a service connection, one of the clients C1-N, 110-1 through N, for example 110-1, requests through an interconnection 130-1 for service connection from a home server 101. Home server 101 has a general connection 150 with a distributed network 190 that includes a number of servers S1-M, 120-1 through M. Home server 101 includes network addresses of all servers in the distributed network 190. After one or more exchanges of information associated with the service connection, a service connection 140-1 may be assigned with at least one of the servers 120-1 through M, for example a server 120-1, to provide the requested service connection. The server 120-1 normally is identified by a network address. Subsequently, client 110-1 communicates directly through service connection 140-1 with server 120-1 for receiving the services it may require. Clients 110-1 through N may include any computing device such as a computer, or communication devices such as a telephone, or an interactive display device such as a television, or a combination of computing, communication and display devices. The service may include service connection for transporting data, video or voice information.

If a service connection, such as service connection 140-1 fails for any reason, the client 110-1 communicates with the home server 101 to receive an address of another server, selected from the servers 120-1 through M, to continue the service. The delay in rebuilding a failed service connection in case of voice and live video connection services is highly undesirable. The delay purposely reduces quality of voice and video service connections. In case of data service connections, when data latency is a factor of quality of service connection, the delay is again highly undesirable.

According to a prior art, a way of improving the fault tolerant of the communication network system is to assign two servers to a communication service connection such that one server functions as the active server and another as a standby server in a synchronous manner. If the active server fails for any reason, the standby server, while being in synchronous with the active server, would take over the service connection activities and provides possibly an adequate and minimally uninterrupted service connection. The standby server in this case has an independent central processing unit (CPU) that works in parallel and synchronous with a CPU of the active server. The standby CPU copies and follows in most part or completely all activities of the active CPU. In case of a failure of the active CPU that causes failure of the service connection, the standby CPU takes over the service connection activities and allows a minimally uninterrupted service connection. The interruption may last for a range of 1–3 mSec. This method may involve, nevertheless, the client and home server interaction to successfully transfer the processing of the service connection from the active to the standby CPU. Keeping a standby CPU active and in synchronous along with the active CPU adds complexity and cost to the network communication system.

Referring to FIG. 2, to build a communication network system with relatively higher fault tolerance according to another prior art, a number of servers may be clustered together to provide the connection services. Such an embodiment is shown by way of incorporating a common cluster block 210 which provides an addressing and switching scheme as to make more than one server in the cluster available for service connection at a time. For example, a service connection 240-1 passes through common cluster 210 to reach a server in the distributed network 190, shown as a cluster in this case, through connection 220. If an initially assigned server fails to provide the service connection, another server selected from a common cluster takes over the service connection with minimal interruption. The change in the server in this case would in most part or completely is transparent to the client 110-1 that originated the request or receiving the service connection 240-1. The common cluster 210 assigns a new address of the selected server to the service connection 240-1. The client 110-1 communicates with the common cluster 210 which would be at a fixed address regardless of the server selected for servicing the service connection 240-1. As a result, the failure of the server becomes transparent to the client 110-1 which eliminates a need to contact the home server 101 for rebuilding the service connection. In turn, a substantial reduction in the latency of reconnection is achieved for providing a continuous service connection when a service connection fails. As such, such common cluster redundancy improves the fault tolerant of the communication network. However, such redundancy and common clustering of the servers is not without cost and complexity. A fault tolerant network communication system is implemented at very high cost and complexity.

Recently, traditional communication systems that mainly used hierarchical network structures have moved to a more distributed structure such as an internet structure to communicate voice, data and possibly video over such distributed structures. Traditional communication networks, particularly in cellular application, included a number of base station transceiver sites (BTS), a number of base station controllers (BSC), and a number of mobile station controllers (MSC). A mobile station initiating a wireless connection with a BTS is forced to utilize BSC and MSC resources that have rigidly provided support services to that BTS. As a result, when resources of a BSC reduce to low levels, the mobile station must change the BTS in order to receive resources from another BSC which may force an interruption of service connection to the mobile station. Moreover, such hierarchical structures in some cases may not provide an optimum usage of available resources. A distributed network may nevertheless be very expensive to provide high fault tolerance network for voice communication in a cellular application which requires low latency.

Therefore, there is a need for a communication network that provides high fault tolerance performance at a minimal cost.

DETAILED DESCRIPTION OF THE PREFERRED EMBODIMENT(S)

Figure 1:
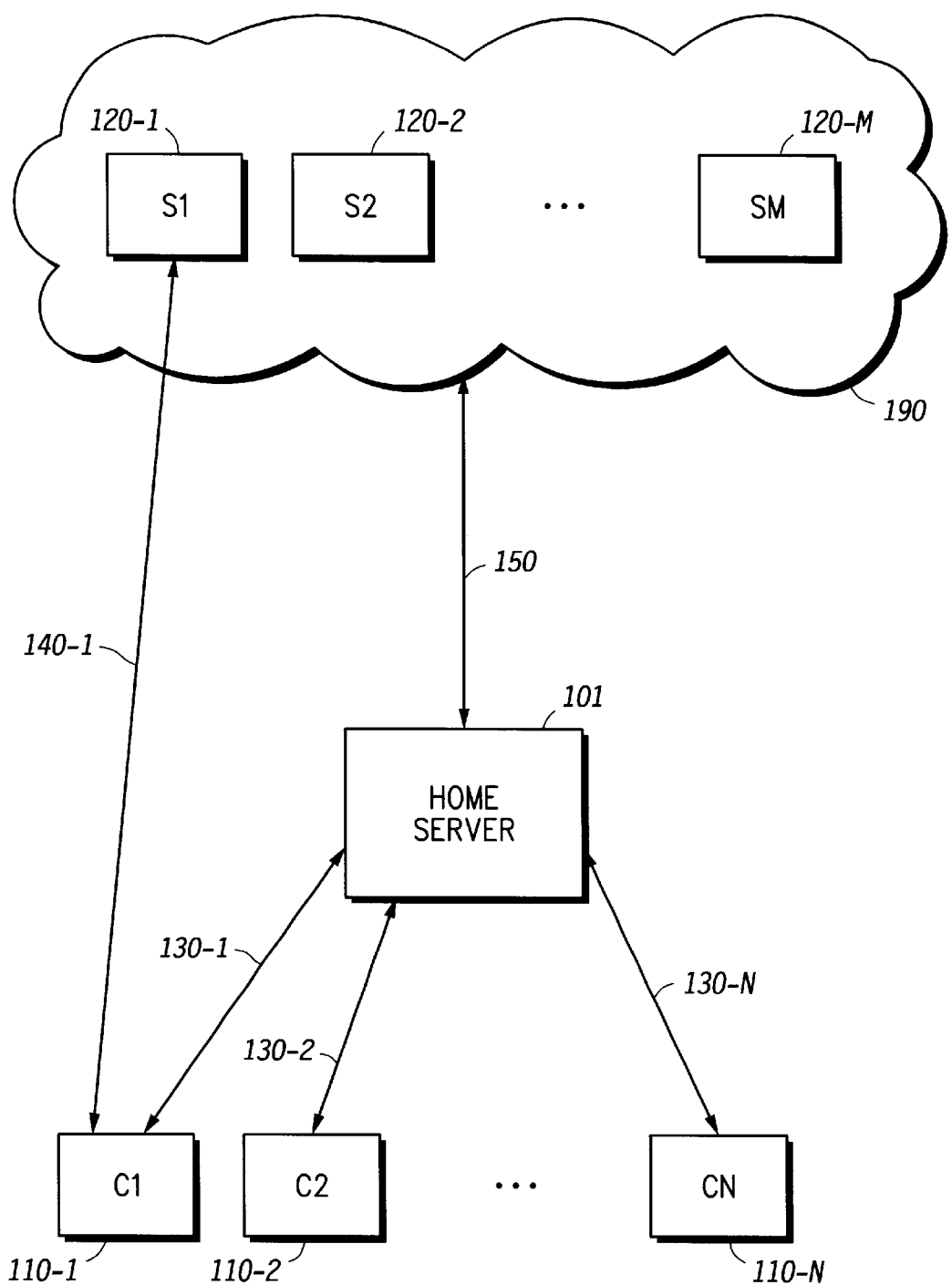
FIG. 1 depicts a conceptual block diagram of a communication network according to a prior art.
Figure 2:
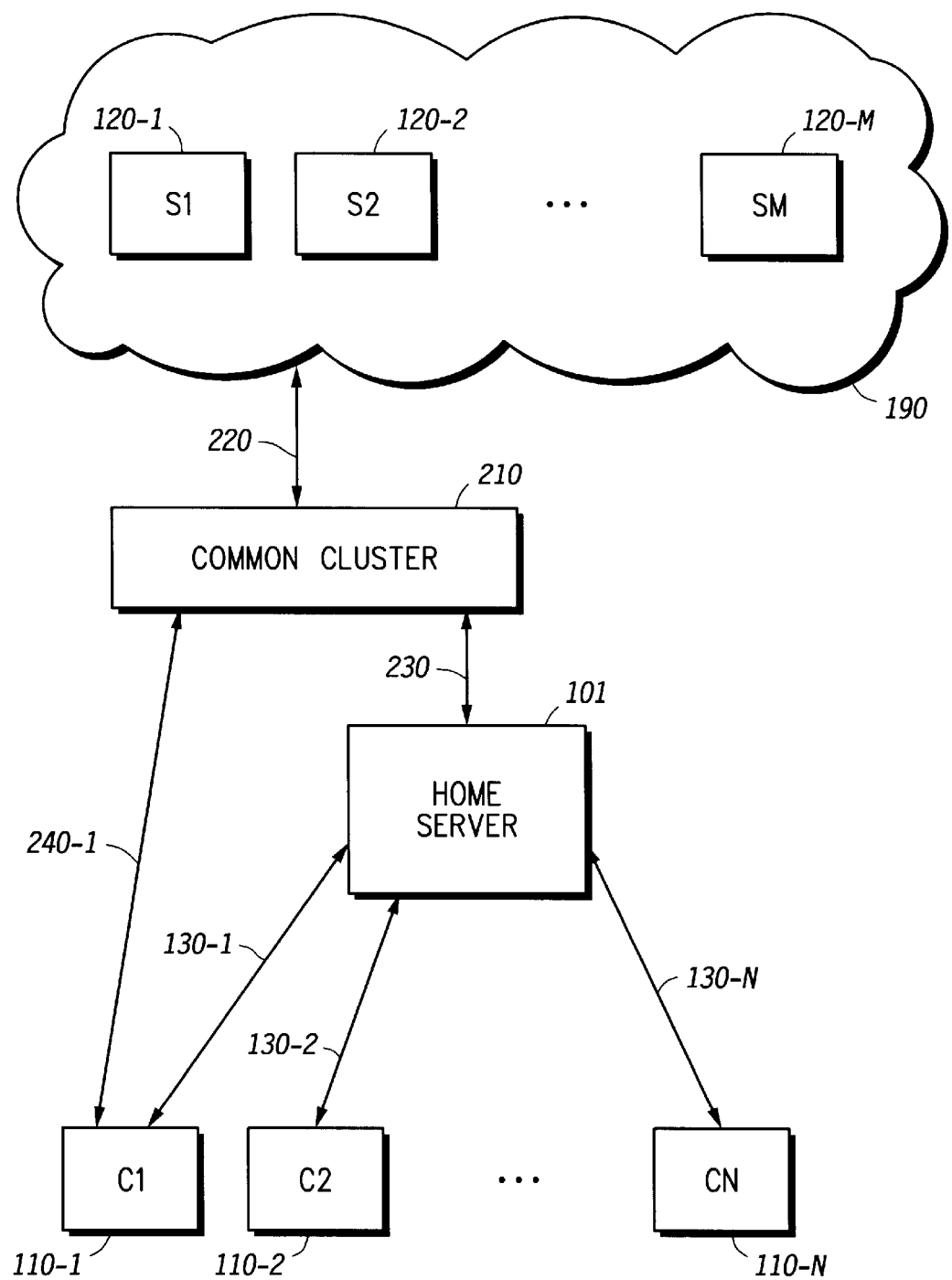
FIG. 2 depicts a conceptual block diagram of a communication network according to another prior art.

According to one or more aspects of the invention, in a network communication system that includes an area network connecting a plurality N of processing units to a plurality K of clients, and a plurality N of memory units each associated with one the plurality N of processing units, a method includes generating a record of state information associated with a service connection, wherein the service connection is between a first of the K clients and a first of the N processing units. The service connection may be between any of the K clients and any of the processing units. The record of state information associates, in a case, to the first of said N processing units. The associated record of state information stores at a first of the N memory units corresponding to the first processing unit. The associated record of state information multicasts over the area network to be received by at least one of a second through N of the N processing units. The associated record of state information stores at one of the N memory units corresponding to the least one of the second through N processing units. Similarly, the steps are repeated for any service connection.

The associated record of state information takes ownership in one of the processing units; the owner of the record may be the least one of the second through N processing units, or the first of the N processing units that initially supported the service connection. The owner of the record of state information may relinquish ownership. The ownership may be relinquished by the least one of the second through N processing units, or the first of the N processing units. The method may include identifying one of N processing units to take ownership of the record of state information. While storing the record of state information, the storing may include at least one of retrieving, comparing, adding, updating, and deleting said associated record of state information. Accordingly, fault tolerance of a communication system network is improved at low cost and complexity.

In one or more embodiments of the invention, a network communication system includes an area network connecting a plurality N of processing units to a plurality K of clients, and a plurality N of memory units each associated with one of the plurality N of processing units. Each of the N memory units is partitioned to N memory segments by way of a step of recording various records. Each of the N memory segments corresponds to a processing unit of the N processing units. The segments are not necessarily predefined in size or location in each memory unit. The size and location may change depending on the amount and specific record being stored in the memory units. The N memory segments may or may not be contiguous. Each memory segment may further include a number of memory segments that may or may not be contiguous. Each segment may be defined according to the stored records that commonly associated with a processing unit.

A record of state information associated with a service connection is generated. The service connection may be between a first of the K clients and a first of the N processing units. The record of state information is stored at a first of the N memory segments of one of the N memory units that corresponds to the first processing unit. The first of the N memory segments corresponds to the first of the N processing units.

Partitioning the memory units to N memory segments may be by way of storing record of state information associated with N processing units. For example, when a processing unit services a service connection, the record of state information of the service call may carry an identification field that associates it with that processing unit. If all processing units each support at least one service connection, each memory unit would have a record of state information being associated with a processing unit. As such, when the records are stored in the memory, the memory units are like being partitioned to store records associated with each processing units. Memory segments, thus, may or may not be fixed. Moreover, each processing unit may be providing services to more than one service connections at a time. In this case, there is more than one record of state information associated with a processing unit.

Figure 3:
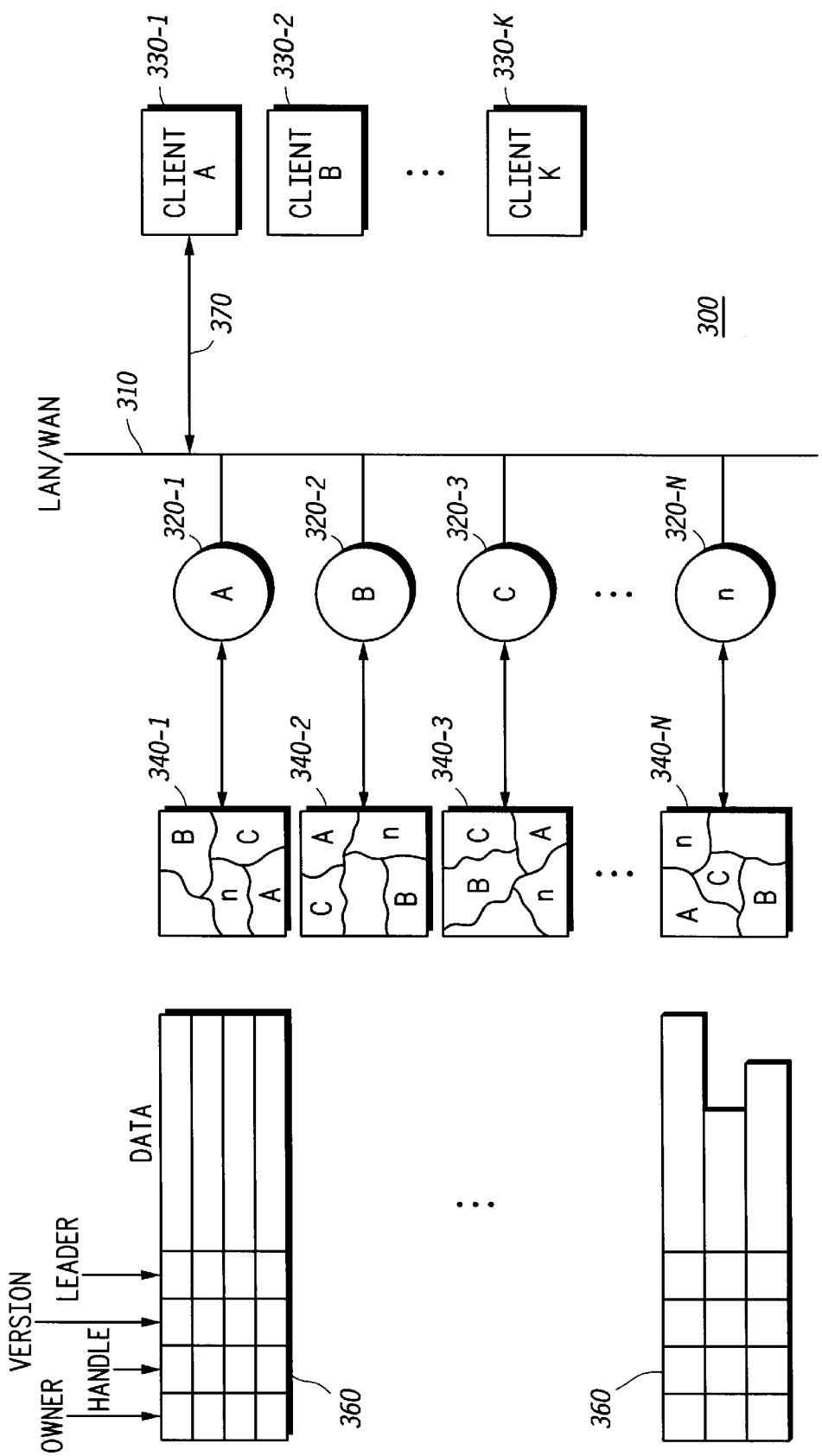
FIG. 3 depicts a conceptual block diagram of a communication network according to one or more aspects of the invention.

Referring to FIG. 3, one or more aspects of the invention are shown by way of a conceptual block diagram 300. Block diagram 300 shows an area network 310 that may be either a local area network or a wide area network as commonly known in a relevant art. Area network 310 connects a plurality N of processing units 320-1 through 320-N to a plurality of K clients 330-1 through 330-K. Each of the processing units 320-1 through 320-N has corresponding memory units, such as memory units 340-1 through 340-N. Each of the N memory units 340-1 through 340-N is partitioned to N memory segments. Each memory segment corresponds to a processing unit and its associated records of state information. For example, memory unit 340-1 is partitioned to four segments, A, B, C and n, where segment A corresponds to processing unit 320-1, segment B corresponds to processing unit 320-2, and so forth.

A record of state information 360 associated with a service connection 370 is generated. The service connection may be between a first of the K clients, client 330-1, and a first of the N processing units, processing unit 320-1. The record of state information 360 is stored at a first of the N memory unit 340-1. The record is stored at a memory segment of memory unit 340-1, the segment 340-1-A that corresponds to the first processing unit 320-1. Furthermore, the record of state information 360 multicasts over area network 310 to be received by at least one of a second through N, 320-2 through 320-N, of the N processing units 320-1 through 320-N. The record of state information 360 is stored at the first of N memory segments of one of the N memory units corresponding to the least one of the second through N processing units, such as memory segment 340-2-A if processing unit 320-2 was the least one of the processing units that received the record of state information 360. There may be more than one processing unit that receives the record of state information 360. Segmentation of the memory units may be by way of identifying an owner of the record of state information of the service connection which is normally the processing unit that is supporting the service connection.

The record of state information 360 may include at least one of an owner of record, a handle of record, a version of record, a leader of record, and a data of record. The owner of record identifies at least one of the N processing units, 320-1 through 320-N, as an owner of the record of state information 360. The owner of the record of state information 360 may be the first processing unit 320-1; however, other processing units may also become owner of the record of state information 360. The handle of record is a key identifier for owner of the record to easily identify the record. The version of record identifies a version of the record of state information 360 since there may be more than one version of the record generated. The leader of record identifies the owner of the state record information 360 as a leader of the state record information 360, or, if the owner of the state record information is in an inactivated state or off-line, owner of the state record information 360 that carries a highest version of record. The data of record includes data associated with the type of service provided, and size of the data field among other data.

Figure 4:
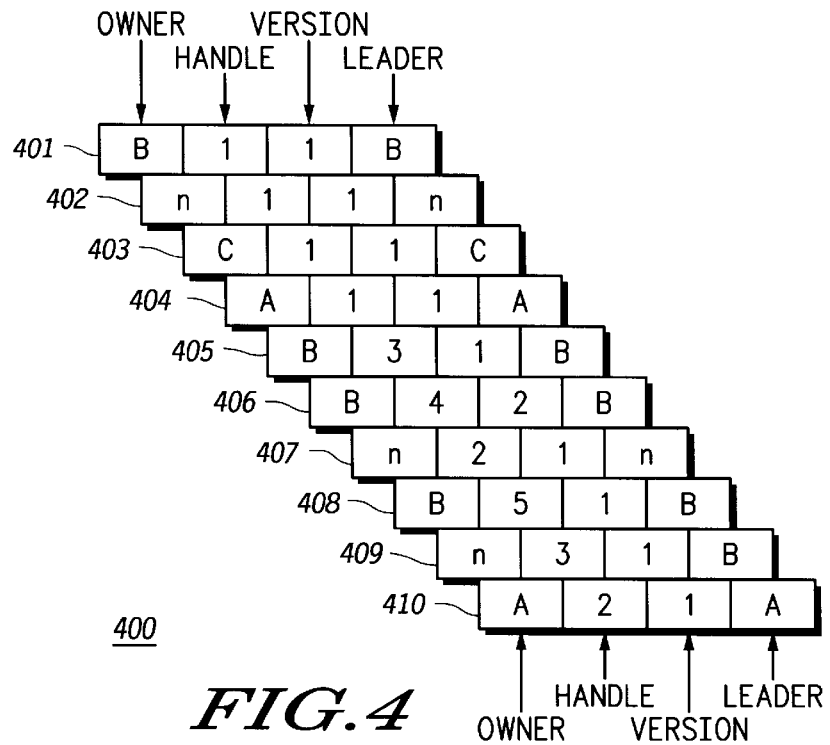
FIG. 4 depicts an example of records stored at a memory unit.

Referring to FIG. 4, various records stored at a memory unit 400 are shown. For example, records 404 and 410, 401, 405–06 and 408, 403, and 402 and 409 have respectively common owner A, B, C, and n, each being a processing unit identified as processing units A, B, C, and n. Processing units A, B and n have more than one associated records. The memory unit 400 effectively is partitioned to four segments, each segment storing at least one record associated with a processing unit.

Each time a service connection is made by a processing unit, the record of state information of the service connection stores at the processing unit, and multicasts to other processing units for storing at their memory units. A new service connection may be made at any time or an existing one may be updated at any time. The storing at either the first of the N memory segments 340-1-A of the memory unit 340-1 that corresponds to the first processing unit 230-1 or the first of N memory segments of one of the N memory units corresponding to the least one of the second through N processing units, such as memory segment 340-2-A if processing unit 320-2 was the least one of the processing units that received the record of state information 360 may include at least one of retrieving, comparing, adding, updating, and deleting the record of state information, such as record of state information 360. The retrieving, comparing, adding, updating, and deleting the record of state information may be performed for retrieving the record, adding the record, deleting the record, creating the record or updating the record. Such functions may be needed for adding new record or updating an exiting record to a newer version. Certain functions, such as deleting a record or updating a record may be initiated by a command by the owner of the record, such that non-owners of the record unnecessarily do not delete or update the record.

A multicast of the record of state information may be done to a selected group of processing units. At the end of broadcasting the record of state information, every processing unit that received the record would have the same record in its respective memory. To make sure an update of a record has been arrived, the processing unit may compare the record with one already exists in memory, and if one does not exist or an older version exists, the newly arrived record is stored in the memory.

The leader of the record identifies which processing unit has the most up to date record of a specific record. Normally, the owner of the record has the most up to date record in its memory segment. However, if the owner of the record is offline or inactivated, a search routine may be implemented to find the most up-to-date owner of the record, or a new owner would be assigned. This may include a step of taking ownership of the record of state information. Any one of the N processing units may take the ownership. Furthermore, leading an ownership of a record may involve relinquishing ownership of the record of state information by a processing unit that currently owns the record. In alternative or combination, the current owner of the record may identify one of the N processing units to take ownership of the record of state information.

As such, according to one or more aspects of the invention, the records of state of information may be shared in asynchronous manner to allow updating and recording the record of the state information that may be implemented by a low cost and complexity system. When a processing unit fails to provide service to a service connection, there is at least one record of state information available in the system that has the latest information to re-establish the service connection. Since the invention includes asynchronous operation, it eliminates a need for synchronous operation of CPUs in the system. As a result, a substantial saving in cost and complexity is achieved. Other advantages of the invention may include scalability of the system. A processing unit may be added or taken off line without effecting the overall operation of the system since a record of all service connections serviced by the processing unit being taken offline is available at other processing units memory units.

The invention supports operation of asynchronous networks. In such networks, low cost hardware equipment may be used to build the network system. Such network systems allow messages from one processing unit to be send and received by another asynchronous of the operation associated with service connections. A message may multicast from a single processing unit to a subset of processing units that form the network. Additionally, at least one processing unit may be able to detect failure of another processing unit in the subset list of processing units.

The processing units set P:={A, B, . . . n} is a set of processing units that may share information according to one or more aspects of the invention. A processing unit may be defined as a hardware processing unit or a software processing unit or a combination of both as commonly known in relevant arts. The members of the process set P are not limited to be co-located at a specific node in the network. In some cases the processing units of set P may be located as a set of processing units in a larger processing unit. Each member of the set may have two separate communication ports, either via software or hardware, for sending and receiving messages. Each member also support multicast communication. One processing unit from the set is able to send a message directly to another processing unit, or alternatively, two processing units may communicate directly with each other. As such, one processing unit can take over functionality of another processing unit. Since a copy of the record is stored at each processing unit, and each record is associated with a processing unit, the ownership and leadership of records at each processing unit can be taken over by other processing units. It is highly desirable to know the last known state and data of every record. Such communication between processing unit does not block any other activity within the processing units such as providing communication services to a number of service connections. This may be achieved by paralleled methods such as splitting the process or, multithreads or any other methods known in the art.

Processing units A, B, C . . . n, of the processing units set P shared among them a copy of state information and other data. Each processing unit also maintain an ordered list of owners which are active processing units in the processing set P. The shared data pass between the processing units whenever this data is updated and or changed. Each processing unit is keeps an ordered list of the record. The record may include a header. The header may include owner of the record, handle of the record, version of the record and leader of the record. The data field may then follow the record. The size of the data field may be optional. There are two communication operations that may be used: Multicasting information to all processing units in the processing set P and sending a specific process to another processing unit.

There may be several operations that are performed as needed. Such operations include Add, Get, Delete, Create, and Update-data, and may be local at each processing unit. With each operation, the data field may or may not be communicated along with the record field. Often times, the data field is not necessary for sharing record data. In the Add operation, the processing unit attempts to find the record in the local memory; if it is not found, then the record is added to the local memory. In the Get operation, a record may be retrieved from the local memory. If the record is found in the local memory, the record will be sent to a processing unit requesting the record. Similarly, for the Delete operation, if the record is found in the local memory, the record is deleted. To create a new record, the record owner is assigned as the same processing unit that is attempting to create the record. The handle of the record is incremented by one, and the record is given version zero. The leader of the record is the owner of the record. When updating a record, the record owner is or becomes the processing unit that is updating the record. The handle of the record may remain the same. However, the version number is incremented by one, and the leader of the record remains as the owner of the record.

A record can be added by any processing unit by creating a record that needs to be shared among the processing units in the processing set P by saving the record in the local memory, and multicasting the record to all of the processing units in the set P. In updating a record, the record can be updated by its owner by replacing the data with the new copy of the data, and updating the version field. This updated record then multicasts to all of the processing units in the set P. To delete a record, the record can be deleted by its owner, which is done by deleting the record from its own memory and then multicasting a delete request to all of the processing units in the processing unit set P.

The operations Add, Get, Delete, Create, and Update-data may be performed asynchronously for every processing unit in the processing set P. Each processing unit broadcasts its current known list of record, and every time it receives a list from other processing units in the processing set P, it compares the record list to its own. If there is a difference between the received record and the one currently residing at the local memory, it updates its record. The processing unit then broadcasts its newly updated record; similarly, if there is no difference, the processing unit may need to do nothing. At the end of this procedure all of the processing units in the process set P will have the same list of record in its local memory.

To update the leader of the record, a processing unit attempt through a procedure to find the most up to date record for a specific record. The processing unit first tries to communicate with the owner of the record. If it succeeds, than the owner of the record must have the most up to date copy in this in its memory. Else, if failed to communicate with the owner, it will initiate a simple Leader Election Algorithm that guaranties to update the Leader field of the specific record. The algorithm may include sending a message that may contain information that includes a request for taking leader of the record, number of iterations, the processing identification of the requester, and a header of the record that needs updating. On the receiving port, when receiving the message, the processing unit compares the record owner identification with its own, and if it matches, it updates the leader of the record in its local memory. This prevents another processing unit that is not owner of a record to update or take leader of the record. The owner of a record may either change the leader of the record or relinquish the leader of the record.

In another procedure, the leader of the record in local memory of every processing unit in the process set P may be updated. In yet another procedure, a processing unit may take ownership of a record. This procedure will work in both cases were the original owner exist or if the original owner of the record is no longer part of the processes set P. In yet another procedure, a record owner may relinquish the ownership of the record. In a similar fashion, the ownership of a number of records may be distributed to a specific processing unit or a group of processing units. In case a processing unit is down or inactivated, its entire record may be given up to other processing units, such that the activity that is taken place with those records will not be stopped. This process should allow continuing connection service to the current records since most of the records are available at other processing units. As such, a substantial time is saved for transferring service of a record from one processing unit to another. With one or more of these procedures after a while, all records associated with the inactivated record are dispensed to other processing units without interrupting the service connections associated with those records. Similarly, a specific processing unit may be removed from the processing set P. The entire distribution should be managed in a distributed fashion. This may be done by a request to take over as many as records as it can from the specific processing unit being taken out of the set. In any case, a processing unit must be aware of its own capacity and performance limitation so it does not break itself.

Figure 5:
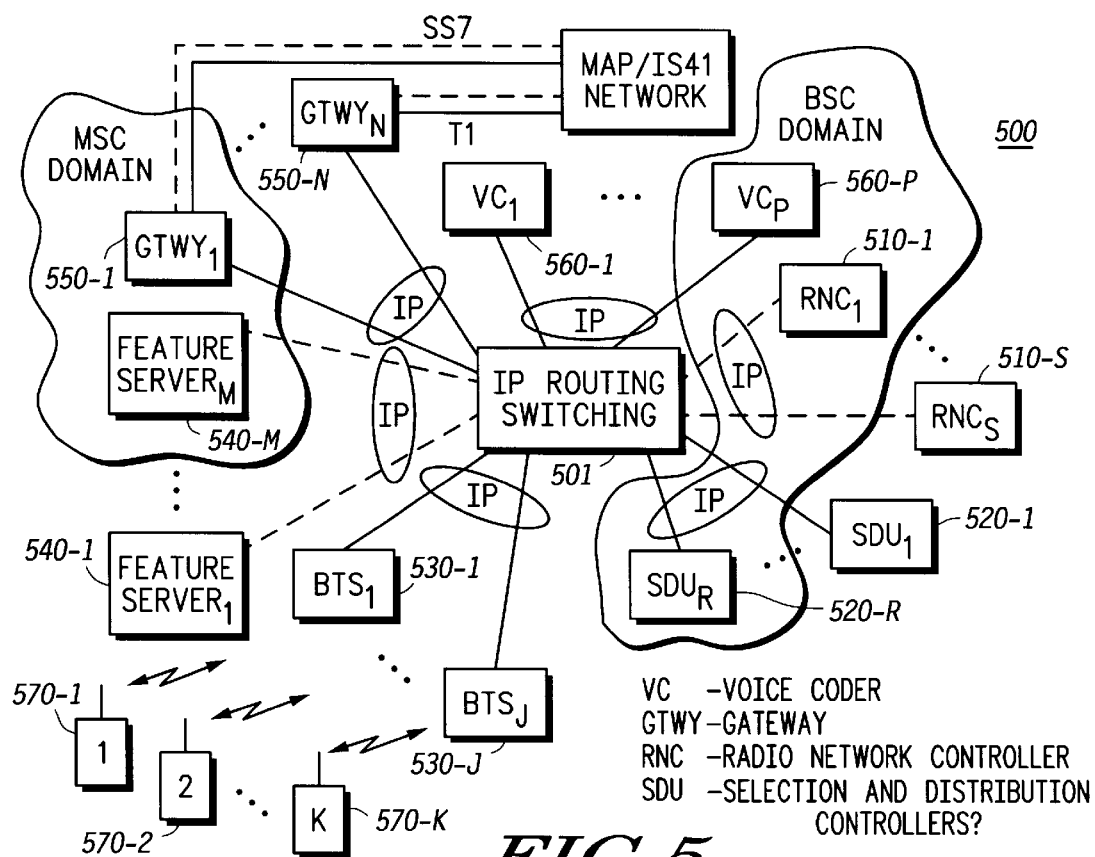
FIG. 5 depicts a conceptual block diagram of a distributed communication system network.

Referring to FIG. 5, a conceptual block diagram 500 of a communication system distributed network is shown. Such network may be used for communicating voice data or other latency sensitive data such as video data. In network communication system 500, an area network 501, shown as an internet protocol (IP) routing switch and its associated IP connections connecting a plurality N of processing units, such as radio network controller (RNC) processing units 510-1 through 510-S, selection and distribution controllers (RNC) processing units 520-1 through 520-R, base station transceiver site (BTS) processing units 530-1 through 530-J, feature server (FS) processing units 540-1 through 540-M, gateway (GTWY) processing units 550-1 through 550-N and voice coder processing units 560-1 through 560-P, to a plurality K of clients, such as mobile station clients 570-1 through 570-K. A record of state information is generated that is associated with a service connection between a first of the K clients and a first of the N processing units. The first of the K clients may be the mobile station 570-1, and the first of the N processing units may be BTS 530-1. The record of state information is associated to the first of the N processing units. The associated record of state information multicasts over the area network to be received by at least one of a second through N of the N processing units, preferably, the BTS 530-2 through 530-J. A characteristic related to capacity and function of at least one of the N processing units, preferably the BTS 530-1 through 530-1, is compared with the associated record of state information to select one of the N processing units, one of the BTSs, as an owner of the associated record of state information. The characteristics may relate to various attributes of the processing units, in this case the BTSs, quality, available of Walsh code in case of code division multiple access communication system, or a combination of different factors.

In further aspect of the invention, a selected processing unit takes ownership of the associated record of state information. The selected processing unit may be at least one of the second through N processing units or the first processing unit. The owner of the record may relinquish ownership of the record of state information, for example, when a processing unit with acceptable characteristics has been identified. The selected processing unit may be the processing unit that is relinquishing ownership, because another processing unit with better characteristic has been identified. This may include identifying one of the N processing units to take ownership of the record of state information.

Selection of a processing unit may be extended to other types of processing units. At different stage of a communication, a VC, RNC, GTWY and SDU may be selected to provide related services to complete the service connection, for example between a mobile station and a BTS. The plurality N of processing units are of a type of at least one of a base-station transceiver station (BTS), a radio network controller (RNC), a selection and distribution controller (SDU), a voice coder (VC) and a gateway (GTWY). According to various aspects of the invention characteristics of at least one of the BTSs, one of the RNCs, one of the SDUs, one of the VCs and one of the GTWYs are compared to provide their respective services as a primary owner of the service connection, and comparing characteristics of at least one other of the BTSs, one other of the RNCs, one other of the SDUs, one other of the VCs and one other of the GTWYs to provide their respective services as corresponding secondary owner for the service connection. When detecting failure of one of the primary owners of BTS, RNC, SDU, VC and GTWY, one of the secondary owners of BTS, RNC, SDU, VC and GTWY is selected to substitute support as a new primary owner for the service connection.

Figure 6:
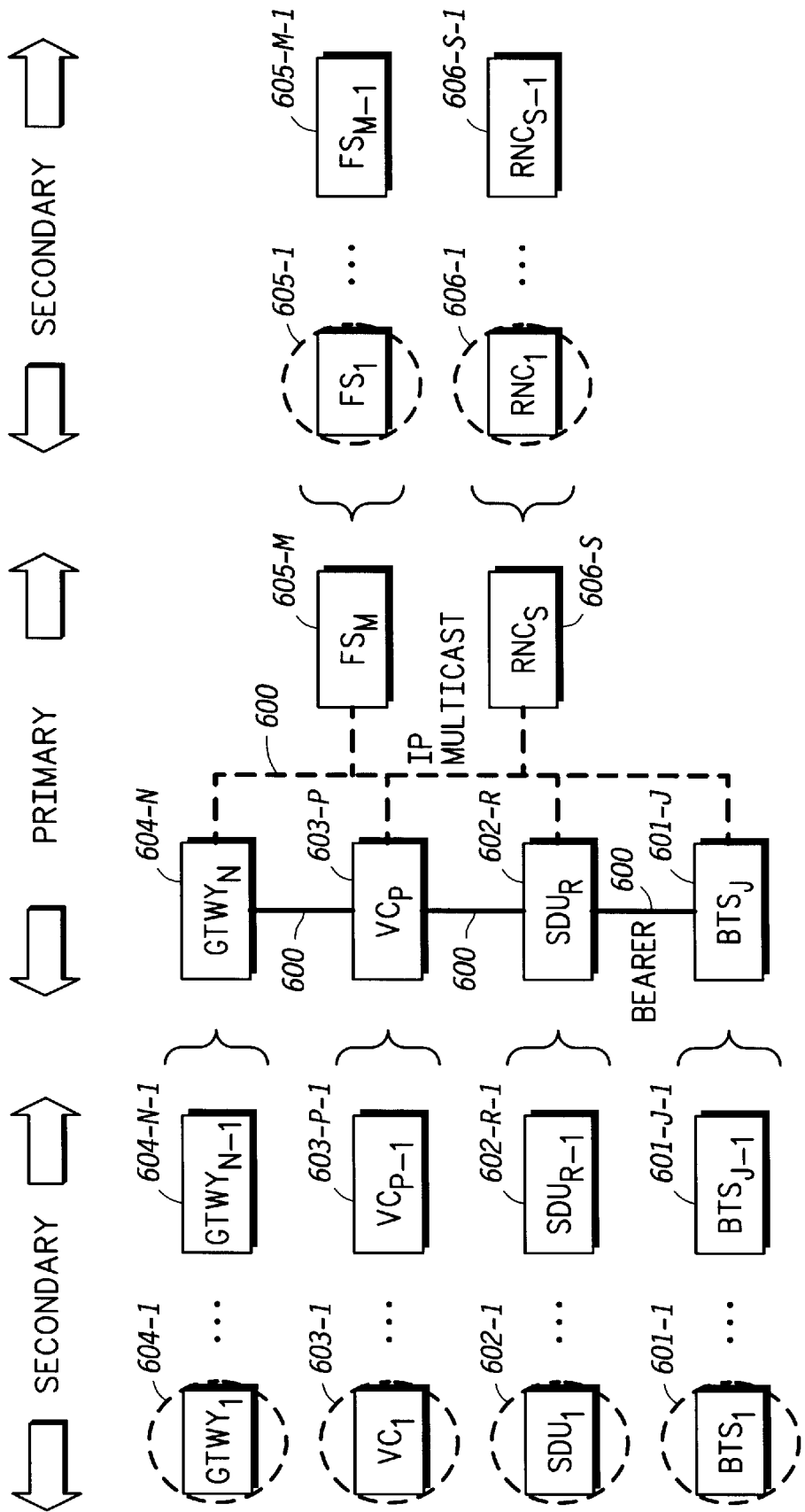
FIG. 6 depicts a logical connection of various processing units according to one or more aspects of the invention.
Figure 7:
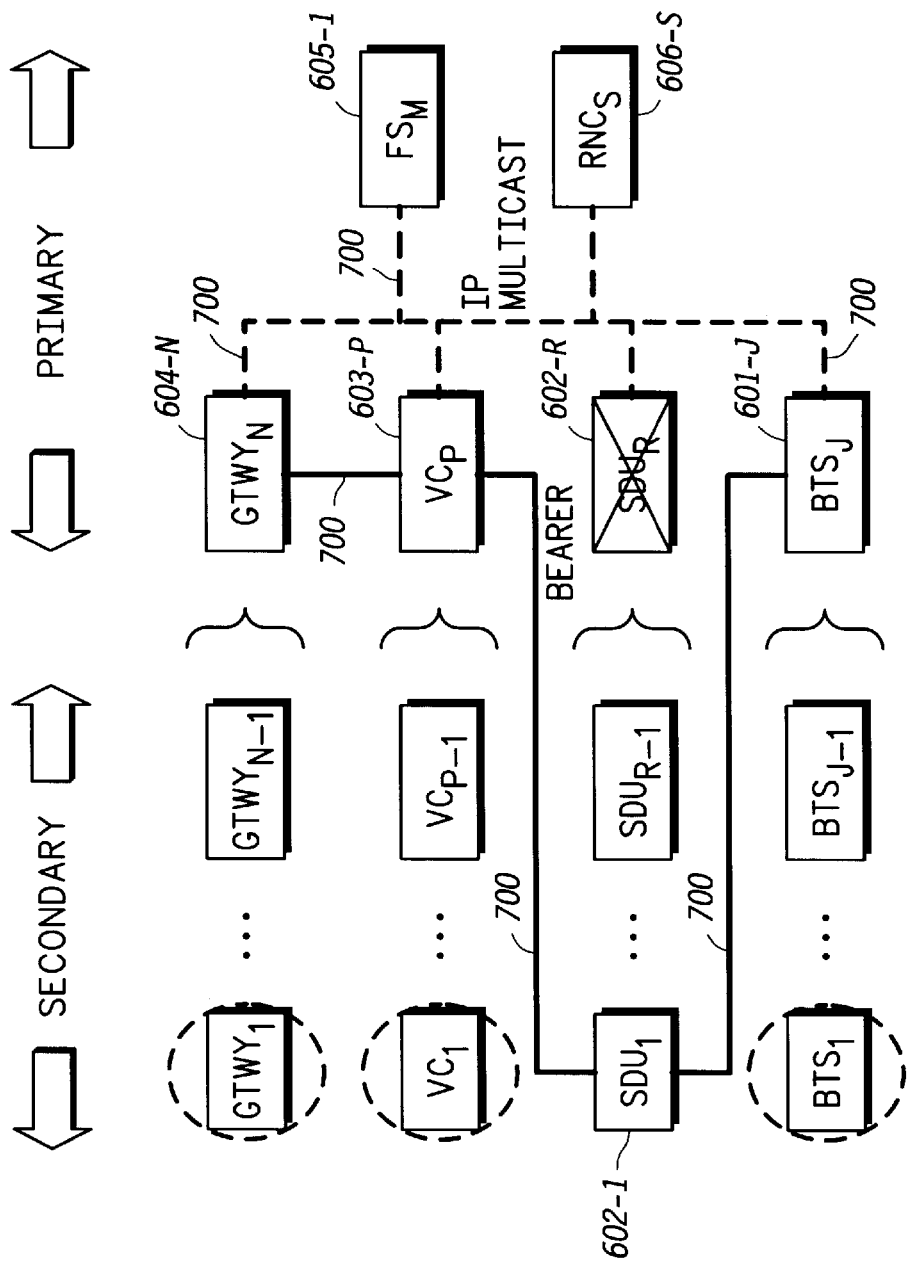
FIG. 7 depicts a logical connection of various processing units according to one or more aspects of the invention.

Referring to FIG. 6, a logical connection 600 of various types of processing units, such a BTS 601-J, SDU 602-R, VC 603-P, GTWY 604-N, FS 605-M and 606-S, is shown to collectively show the various primary processing units selected to establish and support a service connection. All other processing units of similar types, such as BTS 601-1 through (J-1), SDU 602-1 through (R-1), VC 603-1 through (P-1), GTWY 604-1 through (N-1), FS 605-1 through (M-1), and RNC 606-1 through (S1) may be the secondary processing units. Referring to FIG. 7, a logical connection 700 of various types of processing units is shown which is different from the logical connection 600 in that the SDU 602-1 is substituted for SDU 602-R. This substitution may be made when characteristic of SDU 602-1 shows an improvement in performance of the network system or when SDU 602-R fails for any reason.

What is claimed is:

1. In a network communication system that includes an area network connecting a plurality N of processing units to a plurality K of clients, and a plurality N of memory units each associated with one said plurality N of processing units, a method comprising the steps of:

generating a record of state information associated with a service connection, wherein said service connection is between a first of said K clients and a first of said N processing units;

associating said record of state information to said first of said N processing units;

storing, at a first of said N memory units corresponding to said first processing unit, said associated record of state information;

multicasting said associated record of state information over said area network to be received by at least one of a second through N of said N processing units;

storing, at one of said N memory units corresponding to said least one of said second through N processing units, said associated record of state information.

2. The method as recited in claim 1 further comprising the step of taking ownership of said associated record of state information.

3. The method as recited in claim 2 wherein said taking ownership is by said least one of said second through N processing units.

4. The method as recited in claim 2 wherein said taking ownership is by said first of said N processing units.

5. The method as recited in claim 2 further comprising the step of relinquishing ownership of said record of state information.

6. The method as recited in claim 5 wherein said relinquishing ownership is by said least one of said second through N processing units.

7. The method as recited in claim 5 wherein said relinquishing ownership is by said first of said N processing units.

8. The method as recited in claim 2 further comprising the step of identifying one of N processing units to take ownership of said record of state information.

9. The method as recited in claim 1 wherein said storing at said first of said N memory units step includes at least one of retrieving, comparing, adding, updating, and deleting said associated record of state information.

10. The method as recited in claim 1 wherein said storing at one of said N memory units corresponding to said least one of said second through N processing units step includes at least one of retrieving, comparing, adding, updating, and deleting said associated record of state to information.

11. In a network communication system that includes an area network connecting a plurality N of processing units to a plurality K of clients, and a plurality N of memory units each associated with one said plurality N of processing units, a method comprising the steps of:

partitioning each of said N memory units to N memory segments wherein each of said N memory segments corresponds to a processing unit of said N processing units;

generating a record of state information associated with a service connection, wherein said service connection is between a first of said K clients and a first of said N processing units;

storing, at a first of said N memory segments of one of said N memory units corresponding to said first processing unit, said record of state information, wherein said first of said N memory segments corresponds to said first of said N processing units.

12. The method as recited in claim 10 further comprising the step of:
   multicasting said record of state information over said area network to be received by at least one of a second through N of said N processing units;
   storing, at said first of said N memory segments of one of said N memory units corresponding to said least one of said second through N processing units, said record of state information.

13. The method as recited in claim 10 wherein said record of state information includes at least one of an owner of record, a handle of record, a version of record, a leader of record, and a data of record.

14. The method as recited in claim 13 wherein said owner of record identifies at least one of said N processing units as an owner of said record of state information.

15. The method as recited in claim 14 wherein said owner of said record of state information is said first processing unit.

16. The method as recited in claim 13 wherein said handle of record identifies a number of handling of said record of state information.

17. The method as recited in claim 13 wherein said version of record identifies a version of said record of state information.

18. The method as recited in claim 13 wherein said leader of record identifies said owner of said state record information as a leader of said state record information, or, if said owner of said state record is in an inactivated state, owner of said state record information that carries a highest said version of record.

19. The method as recited in claim 13 wherein said data of record includes information about said record of state information associated with said service connection.

20. The method as recited in claim 10 wherein said area network is at least one of a local area network and wide area network.

21. The method as recited in claim 10 wherein said storing step includes at least one of retrieving, comparing, adding, updating, and deleting said record of state information.

22. The method as recited in claim 12 wherein said storing step includes at least of retrieving, comparing, adding, updating, and deleting said record of state information.

23. In a network communication system that includes an area network connecting a plurality N of processing units to a plurality K of clients, and a plurality N of memory units each associated with one said plurality N of processing units, a method comprising the steps of:
   partitioning each of said N memory units to N memory segments wherein each of said N memory segments corresponds to a processing unit of said N processing units;
   generating a record of state information associated with a service connection, wherein said service connection is between a first of said K clients and a first of said N processing units;
   storing, at a first of said N memory segments of one of said N memory units corresponding to said first processing unit, said record of state information, wherein said first of said N memory segments corresponds to said first of said N processing units;
   multicasting said record of state information over said area network to be received by at least one of a second through N of said N processing units; storing, at said first of said N memory segments of one of said N memory units corresponding to said least one of said second through N processing units, said record of state information.

24. The method as recited in claim 23 further comprising the step of taking ownership of said record of state information.

25. The method as recited in claim 24 wherein said taking ownership is by said least one of said second through N processing units.

26. The method as recited in claim 24 wherein said taking ownership is by said first of said N processing units.

27. The method as recited in claim 14 further comprising the step of relinquishing ownership of said record of state information.

28. The method as recited in claim 27 wherein said relinquishing ownership is by said least one of said second through N processing units.

29. The method as recited in claim 27 wherein said relinquishing ownership is by said first of said N processing units.

30. The method as recited in claim 27 further comprising the step of identifying one of N processing units to take ownership of said record of state information.

31. In a network communication system that includes an area network connecting a plurality N of processing units to a plurality K of clients, a method comprising the steps of:
   generating a record of state information associated with a service connection, wherein said service connection is between a first of said K clients and a first of said N processing units; associating said record of state information to said first of said N processing units;
   multicasting said associated record of state information over said area network to be received by at least one of a second through N of said N processing units;
   comparing a characteristic related to capacity and function of at least one of said N processing units with said associated record of state information to select one of N processing units as an owner of said associated record of state information.

32. The method as recited in claim 31 further comprising the step of taking ownership of said associated record of state information by said selected processing unit.

33. The method as recited in claim 32 wherein said selected processing unit is said least one of said second through N processing units.

34. The method as recited in claim 32 wherein said selected processing unit is said first of said N processing units.

35. The method as recited in claim 32 further comprising the step of relinquishing ownership of said record of state information.

36. The method as recited in claim 35 wherein said relinquishing ownership is by said selected processing unit.

37. The method as recited in claim 32 further comprising the step of identifying one of said N processing units to take ownership of said record of state information.

38. The method as recited in claim 31 wherein said plurality K of clients is a plurality of mobile stations.

39. The method as recited in claim 31 wherein said plurality N of processing units are of a type of at least one of a base-station transceiver station (BTS), a radio network controller (RNC), a selection and distribution controller (SDU), a voice coder (VC) and a gateway (GTWY).

40. The method as recited in claim 31 wherein said plurality of K of clients are a plurality of mobile stations, and said plurality N of processing units are of types of a base-station transceiver station (BTS), a radio network controller (RNC), a selection and distribution controller (SDU), a voice coder (VC) and a gateway (GTWY).

41. The method as recited in claim 40 further comprising the steps of:

comparing characteristics of at least one of said BTSs, one of said RNCs, one of said SDUs, one of said VCs and one of said GTWYs to provide their respective services as a primary owner of said service connection;

comparing characteristics of at least one other of said BTSs, one other of said RNCs, one other of said SDUs, one other of said VCs and one other of said GTWYs to provide their respective services as corresponding secondary owner for said service connection.

42. The method as recited in claim 41 further comprising the steps of:

detecting failure of one of said primary owners of BTS, RNC, SDU, VC and GTWY;

selecting one of said secondary owners of BTS, RNC, SDU, VC and GTWY to substitute support as a new primary owner for said service connection.

43. In a network communication system that includes an area network connecting a plurality N of processing units to a plurality K of clients, and a plurality N of memory units each associated with one said plurality N of processing units, an apparatus comprising:

means for generating a record of state information associated with a service connection, wherein said service connection is between a first of said K clients and a first of said N processing units;

means for associating said record of state information to said first of said N processing units;

means for storing, at a first of said N memory units corresponding to said first processing unit, said associated record of state information;

means for multicasting said associated record of state information over said area network to be received by at least one of a second through N of said N processing units;

means for storing, at one of said N memory units corresponding to said least one of said second through N processing units, said associated record of state information.

44. In a network communication system that includes an area network connecting a plurality N of processing units to a plurality K of clients, an apparatus comprising:

means for generating a record of state information associated with a service connection, wherein said service connection is between a first of said K clients and a first of said N processing units;

means for associating said record of state information to said first of said N processing units; to means for multicasting said associated record of state information over said area network to be received by at least one of a second through N of said N processing units;

means for comparing a characteristic related to capacity and function of at least one of said N processing units with said associated record of state information to select one of N processing units as an owner of said associated record of state information.

* * * * *